April 1, 1969 R. YII 3,436,740

VARIABLE COUNT STEP COUNTER

Filed June 8, 1964 Sheet 1 of 2

INVENTOR.
ROLAND YII

BY Kenneth L. Miller
ATTORNEY

INVENTOR.
ROLAND YII
BY Kenneth L. Miller
ATTORNEY

United States Patent Office 3,436,740

Patented Apr. 1, 1969

3,436,740

VARIABLE COUNT STEP COUNTER

Roland Yii, Far Hills, N.J., assignor to Burroughs Corporation, Detroit, Mich., a corporation of Michigan Filed June 8, 1964, Ser. No. 373,459
Int. Cl. G11b 5/00
U.S. Cl. 340—174 3 Claims

ABSTRACT OF THE DISCLOSURE

The disclosure of the present invention describes a counter circuit which utilizes substantially square-loop magnetic cores, each capable of being stepped from one remanent state to the opposite state in a discrete number of incremental steps, and provides a stable transfer circuit, as well as an arrangement for varying the capacity of the individual count cores which finds special application in conjunction with a code converter.

This invention relates in general to magnetic storage devices, and more particularly to such devices which are capable of being stepped in a plurality of discrete stable increments.

Static magnetic core devices of a conventional type generally utilize the two flux retentive levels of a magnetic core as the two stable states of said core, namely, one having a positive remanent state and the other a negative remanent state. When it is desired to determine the storage condition of such a magnetic core, suitable interrogation means are generally applied, by conventional driving the magnetic core to a reference state which may be the negative remanent state, by way of example. In operations of storage, logic or arithmetic, these conventional cores are required for each binary digit.

It is often times desirable to be able to employ a single magnetic core that can be stepped to a plurality of stable states so that the number of cores and their associated driving circuitry may be reduced while still performing the same storage, logic or arithmetic. Moreover, by increasing the number of discrete stable states in which a core can be placed, one is not restricted in system design to the utilization of the binary code. Instead, a core may be stepped to enough discrete stable states so that the multistable magnetic core can produce a carry or overflow output when the multistable state device has reached saturation after 4, 5, 6 or $n$ steps.

In Patent No. 3,102,239 of T. C. Chen and R. A. Tracy, issued Aug. 27, 1963, and assigned to the same assignee as this applicant's assignee, there is shown and described circuit techniques for utilizing a substantially square loop core, referred to in that patent as well as this application as a quantizing core. The switching of such quantizing core from one of its remanent states to its other remanent state serves to step another core, called in that patent and also herein, the count core, a plurality of discrete stable states. The count core has the conventional rectangular hysteresis loop characteristic and also the quantizing core has such a characteristic. When a magnetic field of sufficient magnitude to switch the core is applied to the quantizing core, the core switches from one retentive flux condition to its opposite retentive flux condition. A reset mechanism is normally utilized to thereafter cause the quantizing core to be reset. Such a switched core presents a fixed change of flux linkage with an output winding associated with the qauntizing core and therefore upon successive switchings produces a succession of pulses of substantially equal volt-second or volt-time integral. The multistable state count core is driven by the output pulse induced in a closed output circuit transfer loop associated with the quantizing core. The output circuit is so designed that the core has its magnetization increased from its initial reference flux state through a plurality of intermediate flux levels towards its opposite flux state by a definite reproducible amount each corresponding quantizing core switches.

After a predetermined number ($n$—1) of total switchings of the quantizing core, the count core almost reaches saturation, whereupon it relaxes to its next to the last stable state to await the next switching of the quantizing core. The circuit coupling the quantizing core to the count core is such that the next output pulse induced in the output circuit loop by the switching of the quantizing core will drive the count core into saturation and cause a reset of said count core to its initial or negative remanence state. Thus, if the energy transfer between the quantizing core and the multistable or count core is such as to cause the count core to reach its saturation, the $n$th switching of the quantizing core will cause the count core to be returned to its negative remanence or reference boundary flux level. The return of the count core to the reference boundary flux level is caused by the triggering of the count core reset driver and the switching of the core to its negative remanence, which can be sensed.

In the Chen-Tracy patent, a number of reset devices for the count core are shown. A common technique and one that has proved satisfactory in commercial operation, utilizes the inclusion of a resistor in a transfer loop coupled between the output winding of the quantizing core and the input winding of the count core. A transistor has a control electrode connected intermediate the resistor and the input winding of the count core with the other end of the resistor connected to a source of bias which maintains the transistor in a cut off condition. While the count core is being stepped in discrete intervals, the core represents a relatively high impedance current induced in the transfer loop by the switching of the quantizing core. As a consequence, most of the potential drop is across the input winding of the count core and negligible potential is developed across the resistor. However, when the count core has been stepped to its last discrete stable state, the count core thereafter presents a relatively low impedance to the induced constant voltage pulse in the transfer loop by the switching of the quantizing core and a substantial potential drop takes place across the resistor. This increase in potential drop across the resistor exceeds the bias applied to the transistor and the transistor is caused to conduct. A regenerative effect between the input winding of the count core and the reset winding of the count core causes the core to be quickly reset to its reference level. The resistor in the transfer loop may be adjustable within limits thereby varying the relative impedance between the winding of the count core and the resistor to adjust within a rather narrow margin the number of counts or discrete flux levels which may be set into the count core before that core is caused to be reset. However, varying the resistor in the transfer loop is somewhat inefficient since the circuit is normally designed for an optimum ratio between the resistor and the impedance of the count core winding and a variation of that resistor causes the circuit to be less reliable.

Accordingly, one of the objects of the present invention is to improve upon the circuit of Patent No. 3,102,239 by increasing the stability of operation and also by providing a greater latitude of count variation while still maintaining stability of operation.

A further object of the present invention is to stabilze the count core number of discrete flux levels so that a cascaded design of a counter may be provided in which a quantizing core operates a count core, which count core in turn operates a subsequent count core without the necessity of reintroducing an additional quantizing core following the count core.

A further object of the present invention is to provide an improved magnetic counting circuit in which the number of discrete increments of flux storage within a count core may be increased a number of orders beyond that heretofore achieved.

A further object of the present invention is to provide an extremely stable count circuit operating with an optimumly designed transfer loop and having an adjustable number of discrete flux storage levels within the individual count cores of the counter.

Yet another object of the present invention is to provide an improved transfer circuit operating between stages of a magnetic counter circuit.

One other object of the present invention is to provide an arrangement for varying the capacity of a count core by introducing a parallel network of weighted resistors in series with a fixed voltage supply to control a bias current applied to a winding of the count core.

Applicant has found that he may accomplish the above objects by including an additional direct current biasing network coupled to the count core. If the count core is biased in a forward direction, then the number of discrete intervals between the boundary saturation states of the count core is caused to be less than the designed number of states without the inclusion of such a bias. Further, if the bias is a reverse bias as compared to the direction of quantized input pulses, the number of storage states between the two boundary levels may be increased. Applicant has found that a negative direct current bias applied to the count core has enabled an operation in excess of 100,000 counts. Applicant has also found that a forward biasing of the count core enables extremely accurate and repeatable counts between the boundary storage levels.

The present invention provides an adjustable bias voltage through a winding coupled to the count core in order to vary the number of intermediate counts between the boundary levels of the count core. Additionally, temperature compensating means are provided to add to the stability of the count operation. The transfer loop of the illustrated embodiments of the present invention include a transistor for improved stability and to minimize the feed back to an earlier stage when the count core of a later stage is caused to be reset.

Other objects and features of the present inventon will be found throughout the following description of the invention, particularly when considered in connection with the accompanying drawings in which like reference characters refer to similar elements.

Figure 1:
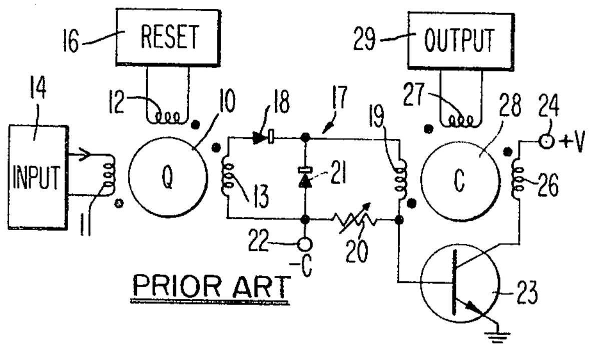
FIG. 1 is a showing of a prior art circuit employed for the operation of a count core being driven by a quantizing core, such circuit being substantially that shown and outlined in the Chen-Tracy Patent No. 3,102,239.

Referring now specifically to the drawings, reference should be made to FIG. 1, which is essentially the showing of a prior art counter technique illustrated and claimed in the Chen-Tracy Patent 3,102,239. For purposes of explanation of the present invention, the quantizing core Q and the count core C may both be comprised of magnetic material having a substantially rectangular hysteresis loop. The quantizing core 10 has three windings, 11, 12 and 13, coupled thereto with the input winding 11 receiving setting pulses from an appropriate input source 14. A reset source 16 thereafter resets the bistable state core 10 to its reference position generating a quantized output across the terminals of the output winding 13. For purposes of explanation of this present application, a dot convention is used indicating the direction of winding of the various coils coupled to the cores. For the convention of this application, current into a dot of a winding tends to establish one flux polarity of a core, and out of a dot tends to establish the opposite polarity. In addition, current into a dot induces current out of a dot of any other winding on the same core; thus the voltage induced is positive on the dotted terminal with respect to its corresponding non-dot terminal.

Accordingly, when current flows through winding 12 entering the dot terminal, it induces a positive voltage on the dot terminal of winding 13. This polarity is of an appropriate direction to enable loop current through the transfer loop 17. This loop includes a forward poled diode 18 in series with an input winding 19 and an adjustable resistor 20. A shunting diode 21 is connected across the winding 19, resistor 20 combination, and the lower end of winding 13 is connected to an appropriate negative bias source 22. The junction between windings 19 and resistor 20 is connected to the base electrode of a common emitter NPN junction transistor 23. The collector of that transistor receives its energization from a positive source connected to terminal 24 through reset winding 26. A third winding 27 is coupled to the count core 28 and provides a signal to output device 29.

In operation of the prior art device, the input source 14 provides a setting current to cause the core 10 to traverse its hysteresis characteristic loop to its set condition. A pulse is generated across winding 13 but is blocked by the diode 18 and is therefore ineffective. Thereafter current from source 16 causes the core 10 to be reset to its opposite flux saturation level, and in so doing provides a pulse of fixed volt-second integral appearing across winding 13. A number of such pulses of current are required in order to cause the count core 28 to be stepped from a reference level to its full capacity or opposite boundary condition. The resetting transistor 23 is biased to a cut off condition due to the negative bias potential applied to terminal 22 and to the base electrode of the transistor through adjustable resistor 20. When the diode 18 becomes forward biased, current is caused to flow through the loop 17 including the winding 19 and resistor 20. The circuit is so designed that the impedance of winding 19 is relatively high compared to the resistance of resistor 20, and accordingly insufficient counter voltage is developed across the resistor to cause the transistor to enter into a conducting state.

Figure 2A:
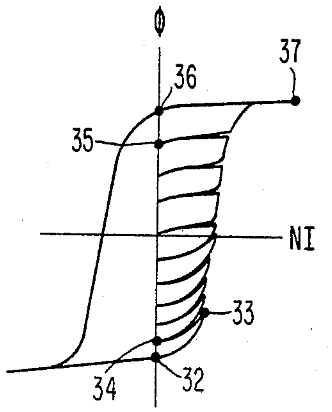
FIGS. 2A, 2B and 2C show typical hysteresis loops indicating multiple operation of a magnetic element with and without biasing.

Each increment of current flowing through winding 19 causes the count core 28 to move a certain amount from one flux level towards the opposite boundary condition. This may be readily understood by referring to FIG. 2A, which is a plot of the flux of the count core plotted as the vertical axis and with the magnetomotive force (NI) plotted as the horizontal axis, where N represents the number of input turns of the winding 19 and I represents the instantaneous current flow through that winding. Assume that the reset remanent state of the count core is at position 32 and a current pulse through winding 19 causes the core to move along a minor hysteresis loop which might move up to point 33 on the curve during the leading edge of the current pulse. At the trailing edge of the current or quantizing pulse the flux fall-back tends to occur, and in the illustrated FIG. 1 embodiment (without bias) the flux would tend to fall back to a remanent condition illustrated by the reference numeral 34. It may thus be seen that a number of such minor hysteresis loop traversals will cause the core to step the flux in increments from one boundary state 32 to an opposite boundary state 36. Once the count core has reached near saturation at flux level 35, the next quantizing pulse causes the core to move along the flat horizontal position to saturation at point 37. The inductive component of the transfer loop is the dominant impedance element during stepping and that component is proportional to the slope of the curve traced along the hysteresis loops. The average inductance during stepping remains high until the core goes into saturation. In saturation the inductive component decreases drastically and the loop current increases as the impedance of winding 19 lowers. Sufficient voltage is thus developed across the resistor 20 to overcome the bias 22 and turn on transistor 23. Current flowing in the emitter-collector circuit of transistor 23 flows through reset winding 26 and is of an appropriate direction to induce an aiding base current due to the regenerative effect between the winding 26 and winding 19. The current amplification factor of the transistor further increases the collector current. Regenerattion continues until the transistor bottoms and the count core 28 is reset. The term "bottom" or "bottoming" as used in the preceding sentence and throughout the present application in connection with transistor operation, refers to the "collector current saturation" of the transistor and the expressions are considered equivalent. "Bottoming" has been used in place of the common transistor terminology of "saturation" to avoid any possibility of confusion with saturation in reference to magnetic core flux. The circuit is so designed that the reset current through the collector of transistor 23 switches the core to its negative remanance state. During this resetting operation an output voltage pulse is generated across winding 27. It may thus be seen that the count of a counter may be varied slightly by an appropriate proportioning between the impedance of winding 19 and that of adjustable resistor 20 by adjusting this loop resistor. Quantized inputs into the transfer loop are desired in order to increase the stability of the individual steps between the two boundary conditions of the count core. Although in FIG. 1 the core 10 has been shown to operate on the reset pulse, it is known that an input pulse could trigger a regeneratively coupled transistor to thereby provide a quantized voltage pulse. In that event, the windings would be connected to unblock the transfer circuit during an input pulse instead of during the reset.

Figure 2B:
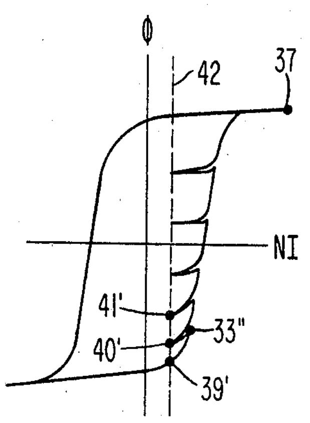
Figure 2C:
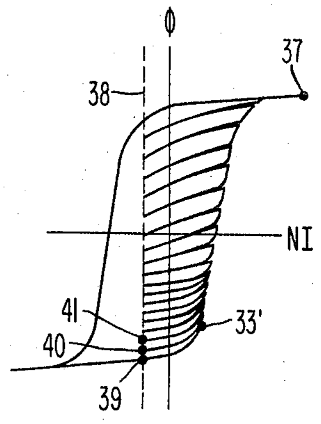

Applicant has discovered that the operation of the prior art devices may be greatly extended or improved through the realization of an independent biasing source for providing a biasing constant magnetomotive force to the count core 28. Referring to the FIG. 2 illustration, an explanation of the phenomenon may be provided. If a reverse bias, which is in the direction of resetting the count core to move from one boundary state to its opposite of an effectively shifting the vertical flux axis to a new ordinate axis 38 (FIG. 2C). Thus, when the count core is completely reset, the remanent level under conditions of reverse biase will be at point 39 instead of point 32. A quantized pulse may then cause a minor hysteresis loop traversal up to point 33′. At the trailing edge of the quantizing pulse the flux fall-back then occurs, but this fall-back is greater than under conditions of no reverse bias and falls beneath the flux level 34 and continues down to the resting point 40. A subsequent quantizing pulse causes a similar minor loop traversal with the flux falling back to point 41. Thus it may be seen that with a reverse bias as compared to the direction of quantizing pulse, since the flux fall-back is greater, it requires a larger total number of quantizing pulses in order to cause the count core to move from one boundary state to its opposite boundary state. Also in the case of a reverse bias, the stepping up at the end of the quantizing pulse is less than that without the bias (whereas the converse is true for forward bias). Therefore, the difference in flux fallback plus the difference in the amount of stepping contribute to affect the change in overall count depending upon the bias.

If forward bias, which is in the direction of setting the count core, is used establishing a new ordinate axis 42, a first quantizing pulse causes a minor loop traversal from point 39′ to point 33″ followed by flux fall back. It may be seen that the flux fall-back to points 40′ and 41′ is considerably less during each quantizing pulse than without bias or with reverse bias resulting in a smaller number of quantizing pulses in order to move the core from one boundary state to its opposite boundary state. During actual operation greater than 100,000 counts have been observed under conditions of reverse bias, such operation being repeatable during successive count cycles at the room temperature. The forward biasing conditions have been found to lessen the number of increments between the boundary states of flux extremities and also have been found to provide extreme accuracy or repeatability under widely varying conditions of voltage and temperature variation. Thus the discovery of the application of a biasing magnetomotive force to the count core leads to a much more practical variable count counter operation. With the extension to a successful cascaded arrangement, variable and reliable extremely large count counters under control of a bias field can be achieved with minimum hardware.

Figure 3:
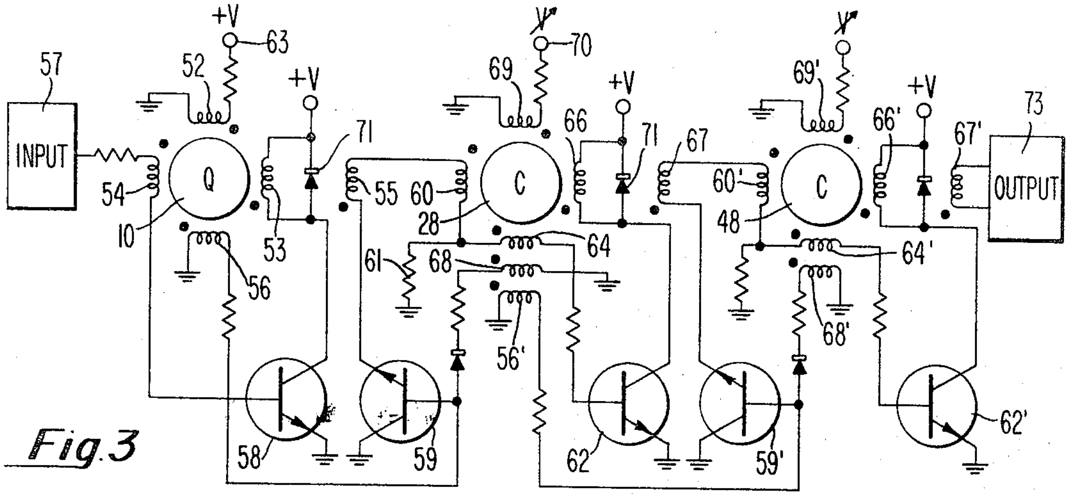
FIG. 3 is a cascaded counter arrangement utilizing the principles of the present invention.

FIG. 3 illustrates one such cascaded design utilizing a bias control of the count cores. The circuit includes a quantizing core 10 and a count core 28, as in the prior art technique, but extends this arrangement by utilizing the output from the count core directly in lieu of a further quantized core input to a subsequent count core 48. Additionally, count core 48 may in turn drive another count core, if desired, which would be a QCCC cascaded design. If each of the count cores is capable of operating in ten steps, for example, a decimal QCCC cascade arrangement provides a simple technique for counting down by 1,000. Furthermore, the independent control of biasing levels to each of the count cores in the cascaded design permits an arrangement whereby an adjustable count may be simply established.

In FIG. 3, quantizing core 10 includes a reset winding 52, a collector winding 53 and a regenerative feedback winding 54, as well as an output winding 55 and a gating winding 56. A trigger input 57 provides a positive pulse to the base electrode of transistor 58 causing that transistor to turn on and to draw current through collector winding 53. The feed back through the base winding 54 causes transistor 58 to bottom and the collector current switches the quantizing core to one of its bistable state conditions. The bottoming of transistor 58 generates a voltage across winding 55 in the transfer loop between core 10 and core 28. Additionally, an unblocking pulse is developed across winding 56 which causes transistor 59 in the transfer loop to turn on. A pulsed current is thus permitted to flow in the transfer loop through the emitter-collector path of transistor 59 and the input winding 60 of the first count core 28. The winding 60 serves as a relatively high impedance as compared to the resistor 61 in the transfer loop during the stepping of the count core. Accordingly, insufficient potential is developed across resistor 61 to turn on reset transistor 62. A direct current source is provided to the quantizing core which enables a resetting current to flow from source 63 through reset winding 52, thereby readying the quantizing core for the next input trigger from input source 57. In a typical operation, assume that the count core has been designed so as to accept ten counts. This identical input operation will continue until the tenth quantized input is provided to winding 60. At that time the winding 60 represents a relatively low impedance due to saturation of count core 28 and the loop current is caused to increase. This increase in current develops a sufficient voltage across resistor 61 to turn on the reset transistor 62. In the circuit as shown in FIG. 3, an additional regeneratively coupled winding 64 is provided for increasing the feed back as soon as the reset transistor is turned on to cause transistor 62 to rapidly bottom, thereby resetting count core 28. The additional winding also prevents the reset transistor from turning on during stepping until the count core is heavily in saturation. During the reset operation the collector current of transistor 62 flows through collector winding 66 and a single output is generated across winding 67 in the transfer loop between count core 28 and the following count core 48. In order to preclude back flow of current in the transfer loop from the count core 28 back into the quantizing core 10, a blocking winding 68 is coupled to count core 28 and is so wound as to block current flow through transistor 59 thereby opening that transfer loop.

In the operation of count core 28, particular emphasis should be given to the biasing winding 69 which receives an amount of direct current bias flow from a variable voltage source connected to terminal 70. Refer once again to the FIG. 2B hysteresis loop illustration. It is clear that the positive bias source connected to terminal 70 actually forward biases the count core 28 establishing, in effect, a new ordinate flux axis 42. Using forward bias, a smaller number of steps actually appear between the boundary conditions of the count core with the number of increments varying in accordance with the relative magnitude of current bias applied. The variable feature of the bias current has been shown by an adjustable source. It is understood that the series resistor could be adjusted to vary the current. Each of the reset transistors utilizes a diode 71 connected across the collector winding in order to rapidly damp out any tendency for a reverse current flow in the transfer loop when the transistor 59 is caused to turn off.

The output winding 67 of count core 28 is similarly connected in a transfer loop through an additional gating transistor 59′ and an input winding 60′ for the subsequent count core 48. That core is likewise provided with direct current bias winding 69′, collector winding 66′, output winding 67′, a blocking winding 68′, and a regenerative feed-back winding 64′. The transfer loop between count cores 28 and 48 is permissive when the transistor 62 operates to reset count core 28 providing a quantized pulse across winding 67 and an unblocking pulse across winding 56′ connected to the base of gating transistor 59′. The operation of count core 48 is thereafter the same as that of count core 28 and after receiving the appropriate number of quantized input pulses, transistor 62′ is caused to conduct resetting the count core 48 and providing an output to the load 73 connected across output winding 67′. It is also understood that a load may be directly connected to the collector of transistor 62′, if desired. Furthermore, additional count cores can be directly coupled to the output winding 67′ or for a single stage only one count core need be included in any operating circuit. Moreover, the diode coupling technique shown in FIG. 1 may be desired under certain circumstances in place of the transistor transfer circuit of FIG. 3.

The use of a current bias on the count bore is recommended for controlling and stabilizing the count. One particular advantage that may be gained is that the value of the transfer loop resistor can be optimized by selecting a fixed value which is low in comparison with the core impedance during stepping, but high in comparison with the core impedance at saturation. Thus the adjustable loop resistance of the prior art may be replaced by a fixed resistor and a variable current control allowing wider loop resistance tolerances.

Figure 4:
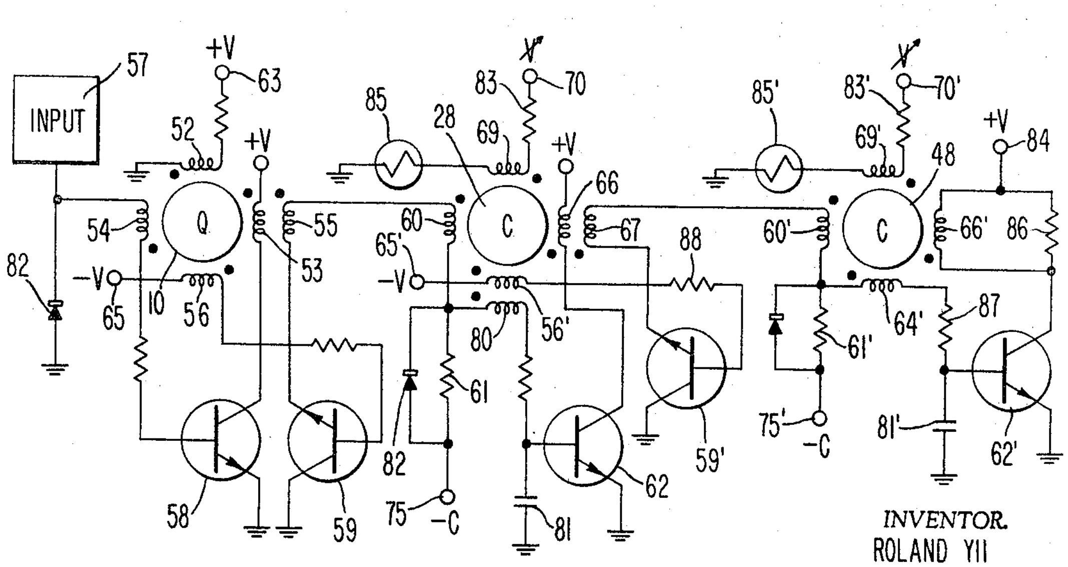
FIG. 4 is a preferred embodiment of the present invention.

Refer now to FIG. 4, the principal embodiment of the present invention. The circuit includes a quantizing core 10 followed by a count core 28 and a subsequent count core 48. An input trigger source provides input positive going trigger pulses to the base of transistor 58. The quantizing core 10 is initially at a reset saturation level due to current flow through winding 52 from positive current reset source connected to terminal 63. It is understood that source 63 completely resets quantizing core 10. The trigger pulse initiates collector current flow from transistor 58 through collector winding 53, which is regeneratively coupled to base winding 54. The regenerative effect causes the transistor 58 to bottom, thereby setting the quantizing core 10 to its opposite saturation condition and providing a quantized pulse to the transfer loop across the terminals of winding 55 and also providing an unblocking pulse at winding 56 to the base of gating transistor 59, which is included in the transfer loop. In the FIG. 4 embodiment, the transistor 59 is biased off due to the small negative bias V applied at terminal 65 with respect to the less negative voltage C applied at terminal 75. The voltage induced in winding 56 overcomes that bias and thereby enables loop current to flow through input winding 60 of count core 28. A small negative bias C provided at terminal 75 maintains the transistor 62 associated with count core 28 in a non-conducting state. When a count pulse is applied to winding 60 it causes the count core to move up in steps as heretofore described, and since the impedance of winding 60 is relatively high compared to that of resistor 61, the transistor 62 is maintained in a cut off condition. An additional regenerative feed back winding 80 is connected between the base electrode of transistor 62 and the junction of winding 60 and resistor 61. This winding is regeneratively coupled to the collector winding 66 and rapidly causes transistor 62 to bottom thereby resetting count core 28. A stabilizing capacitor 81 is connected between the base of transistor 62 and the common reference potential to minimize a false triggering due to transient noise pulses. Diodes 82 provide an alternating current ground for the base winding as soon as the reset transistor associated with the individual core is triggered. The count core 28 is provided with a direct current baising winding 69 connected to the adjustable direct current bias current source connected to terminal 70 through a resistor 83. The direct current bias also flows through a sensistor 85 for temperature compensation.

The count core 28 also includes an output winding 67 for driving the transfer loop of the subsequent count core 48. The operation of this stage is the same as that of the previous state and the circuit connections are likewise the same. Count core 48 has associated therewith a direct current bias winding 69′, an input winding 60′, a base winding 64′ and a collector winding 66′. The reset transistor 62′ is connected to a positive voltage source through collector winding 66′ and terminal 84. The output load 86 may be connected between the collector electrode of the transistor and the positive voltage source V. As in the previous stage, there is included a stabilizing capacitor 81′ and a current limting resistor 87. The bias for transistor 62′ is connected to terminal 75′ through the loop resistor 61′. The gatting transistor 59′ in the coupling loop is gated on by a potential appearing across 56′ which overcomes the bias connected to terminal 65′. Likewise the base current for transistor 59′ is controlled through limiting resistor 88. The bias for the winding 69′ is similarly provided by an adjustable voltage connected to terminal 70′ through a dropping resistor 83′ and a temperature compensating sensistor 85′. It is understood that the bias applied to the count core 48 may be selected independently of that applied to count core 28 permitting "p" steps for one core and "n" steps for another to arrive at a desired overflow of the cascaded counter circuit at the appropriate overall count desired.

Figure 5:
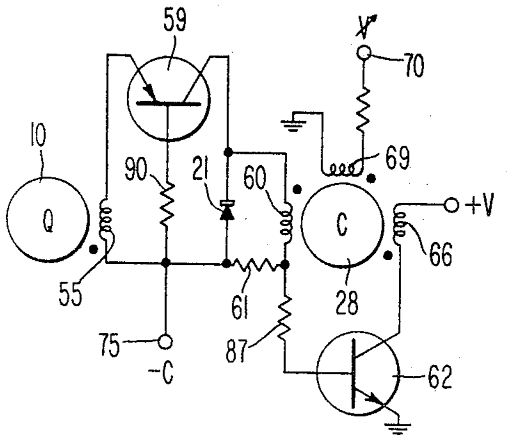
FIGS. 5 and 6 illustrate two further embodiments of the present inventon with a modified transfer loop.

FIG. 5 is a partial schematic of a single stage having a quantizing core 10 and a count core 28. Unlike the FIG. 4 embodiment, the additional winding 56 on the quantizing core is eliminated by altering the arrangement of the gating transistor 59 in the transfer loop. The emitter electrode of PNP transistor 59 connects to the non-dot end of winding 55 and the collector connects to the dot end of input winding 60. Base resistor 90 connects to the junction between the lower end of winding 55 and the bias terminal 75. Resistors 61 and 68 complete the connection to the base of NPN reset transistor 62 which is normally biased off by the source connected to terminal 75. Diode 21 prevents back transfer when the count core resets. The bias current applied to winding 69 is provided by an adjustable source connected to terminal 70 to vary the count of the counter.

In operation, when the quantizing core is triggered, a positive voltage is generated at the non-dot end of winding 55, thereby causing transistor 59 to turn on and pass current through winding 60 to move up one step along the hysteresis of loop count core 28. The *n*th pulse causes core 28 to saturate thereby triggering reset transistor 62. As in the other counter embodiments, a variation in bias current through winding 69 causes a control of the count capacity of the count core.

Figure 6:
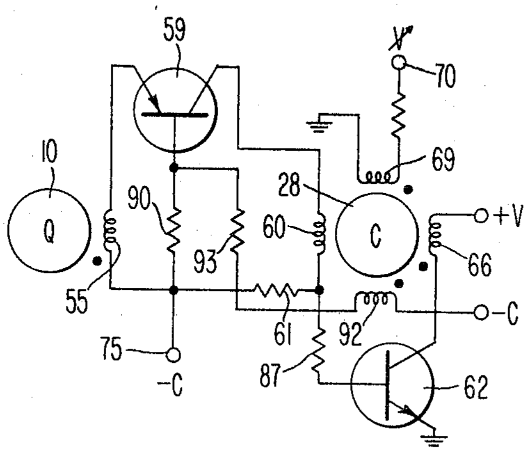

FIG. 6 is similar to FIG. 5 and common reference numerals are used. In FIG. 6 the diode 21 has been replaced by a winding 92 on count core 28 to block current flow through transistor 59 during reset of the count core. A voltage induced in winding 92 applies a reverse bias through resistor 93 to the base of transistor 59.

Figure 7:
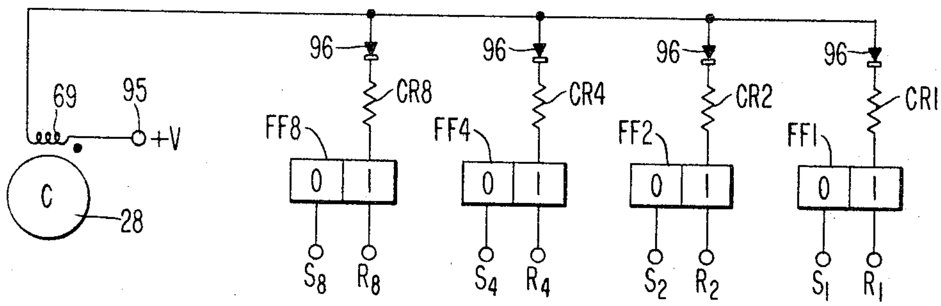
FIG. 7 shows one technique for controlling the count capacity of a count core by a coded input.

FIG. 7 schematically provides a variation in the fashion for biasing winding 69 of count core 28. This technique may be used with the count core of any of the forms hereinbefore described. A regulated positive voltage source, source as is provided by a Zener diode, is connected to terminal 95. A series of flip-flops FF1, FF2, FF4 and FF8 is provided with conventional set and reset inputs, S1, 2, 4, 8 and R1, 2, 4, 8, respectively. The flip-flops each include cross-coupled NPN transistors having a binary "1" and "0" half. The collector electrode of the "1" half of each flip-flop may be connected to its operating voltage source through a weighted collector resistor CR1, 2, 4, 8 and an isolating diode 96. The different weighted resistor values are selected, by way of example, in accordance with a binary coded input pattern to provide selected increments of collector current through bias winding 69, thereby controlling the count capacity of a count core in accordance with the input pattern applied to the flip-flops.

It is obvious that many changes and modifications will now be apparent to those skilled in the art. Although opposite conductivity type NPN or PNP transistors may be utilized, applicant has found that care should be taken for best reliability in the choice of circuit elements. It is desirable to use transistors whose charge carries may be readily and rapidly swept out for higher speed operation of the counter.

If a long chain of count cores is used, it may be desirable to reestablish a quantized voltage pulse at chosen points in the chain. This may be done simply by breaking the chain intermediate two count cores. The output winding of the first count core is connected to a differentiator. One of the differentiated voltage spikes then serves to trigger on a reset transistor, such as transistor 58 (FIG. 4), for a quantizing core. The output of the quantizing core then is coupled through a conventional transfer loop to the next count core in the chain.

It is therefore seen from the foregoing description of the invention and its mode of operation that improved counting means is afforded for obtaining discrete reproducible increments of storage states in a multistable core. This is accomplished by employing a quantizing core that upon switching will yield a substantially constant quantized output, said quantized output being available through a transfer loop as switching energy for the multistable core. Moreover, control and reliable operation and count of the count core may be accomplished by providing a control level of biasing magnetomotive force to the count core. Such control is readily had by providing an adjustable voltage to bias winding associated with the count core through a resistor or by a fixed voltage through different selected fixed value resistors. Furthermore, a cascaded count core arrangement may be arrived at with greater flexibility through the utilization of bias control to the various count cores of the chain. These novel features and those apparent variations thereof believed descriptive of the nature and scope of the invention are defined with particularity in the appended claims.

What is claimed is:

1. A counter circuit comprising a magnetic count core capable of being switched from a boundary state of magnetic remanence of reference polarity to a boundary state of opposite polarity in *n* discrete steps, an input winding coupled to said core, a reset winding coupled to said core, means for connecting quantized input pulses to said input winding thereby causing the flux level of said count to step towards said boundary state of opposite polarity in response to pulses to be counted, means providing a reset current through said reset winding in response to an *n*th quantized input pulse thereby resetting said count core to its reference boundary state, a direct current means establishing a steady biasing magnetomotive force on said magnetic count core to thereby control the number *n* of discrete steps when stepping between the boundary states of said count core, a quantizing magnetic core capable of being placed in bistable storage states, an output winding coupled to said quantizing core, and a transfer loop interconnecting said output winding of said quantizing core and the input winding of said count core and including a asymmetrical current conducting means which is caused to conduct only when said quantizing core is driven to one of said bistable storage states, said asymmetrical current conducting means being a gating junction transistor having an emitter, a collector and a base electrode and whose emitter-collector path is in said transfer loop, said emitter electrode being connected in series relationship with said input winding of said count core, said collector electrode being connected to a source of reference potential, a gate winding inductively coupled to said quantizing core and having one end thereof connected to the base electrode of said gating transistor through a first resistor, the other end of said gate winding being connected to a first bias source which is effective in biasing said gating transistor to nonconducton thereby preventing reverse current flow in said counter due to the resetting of said count core, said transistor being gated on by a gating potential applied to the gating transistor base electrode of sufficient magnitude and proper polarity to overcome the bias developed across said gate winding only when said quantizing core is driven to said one of said bistable storage states, said biasing of said count core to control the number *n* of counting steps being provided by a bias winding inductively coupled to said count core and connected to an adjustable direct current source through a temperature compensating control means, a reset junction transistor having an emitter, a collector and a base electrode, said transfer loop including a second resistor, one end of which is conected to the base electrode of said reset transistor through the series connection of a feedback winding inductively coupled to said count core and a third resistor, the other end of said second resistor being connected to a second bias source of the same polarity but of lesser amplitude than said first bias source, and being effective in biasing said reset transistor to a nonconducting state, the voltage appearing across said second resistor in response to said *n*th quantizing input pulse being of sufficient magnitude and proper polarity to overcome the bias from said second source and to trigger said reset transistor to conduction, the base electrode of said reset transistor being connected to said reference potential by way of a stabilizing capacitor, the emitter electrode of said reset transistor being connected to said reference potential, the collector electrode of said reset transistor being connected to a supply voltage through a collector winding inductively coupled to said count core, the triggering of said reset transistor to conduction causing current flow through said collector winding which when aided by the regenerative effect of said feedback winding results in the resetting of said count core to its reference boundary state, and a diode connected across said second resistor forwardly poled to bypass said last-mentioned resistor during reset of said count core.

2. A counter circuit as recited in claim 1 wherein said direct current means includes a regulated voltage source in series with a bias winding coupled to said count core and connected to a reference voltage source through a plurality of fixed resistors selectively switched into the bias circuit.

3. A counter circuit as recited in claim 2 wherein said fixed resistors are weighted resistors operatively connected to one output side of respective flip-flop control devices.

References Cited

UNITED STATES PATENTS

| | | | |
|---|---|---|---|
| 2,925,958 | 2/1960 | Polzin et al. | 340—174 X |
| 2,968,796 | 1/1961 | Lane et al. | 340—174 |
| 2,992,393 | 7/1961 | Gray et al. | 340—174 X |
| 3,102,239 | 8/1963 | Chen et al. | 340—174 X |
| 3,214,741 | 10/1965 | Tillman | 340—174 |
| 3,226,562 | 12/1965 | Neitzert | 340—174 X |
| 3,246,306 | 4/1966 | Young | 340—174 |

OTHER REFERENCES

J. D. Freeman, "New Idea in Counting: Incrementally Magnetized Cores," Electronics, June 15, 1962, pp. 40–43.

TERRELL W. FEARS, *Primary Examiner.*

JOSEPH F. BREIMAYER, *Assistant Examiner.*

UNITED STATES PATENT OFFICE

CERTIFICATE OF CORRECTION

Patent No. 3,436,740 April 1, 196?

Roland Yii

It is certified that error appears in the above identified patent and that said Letters Patent are hereby corrected as shown below:

Column 1, line 32, "tional" should read -- tionally --. Column 2, line 3, before "core" insert -- count --. Column 5, line 54, "to move from one boundary state to its opposite" should read -- , is applied to core 28, the current bias may be thought --; line 58, "biase" should read -- bias --. Colum 9, line 15, "of loop" should read -- loop of --; line 30, "source", second occurrence, should read -- such --; line 50, "carries" should read -- carriers --.

Signed and sealed this 7th day of April 1970.

(SEAL)
Attest:

Edward M. Fletcher, Jr.
Attesting Officer

WILLIAM E. SCHUYLER, JR
Commissioner of Patents